United States Patent [19]

Lindsay

[11] Patent Number: 5,469,793
[45] Date of Patent: Nov. 28, 1995

[54] TILTABLE LOAD SUPPORTING PLATFORMS

[75] Inventor: Richard A. Lindsay, Eye, United Kingdom

[73] Assignee: Vinten Group plc, United Kingdom

[21] Appl. No.: 66,070

[22] PCT Filed: Nov. 29, 1991

[86] PCT No.: PCT/GB91/02120

§ 371 Date: May 26, 1993

§ 102(e) Date: May 26, 1993

[87] PCT Pub. No.: WO92/09846

PCT Pub. Date: Jun. 11, 1992

[30] Foreign Application Priority Data

Nov. 29, 1990 [GB] United Kingdom ............... 9026004

[51] Int. Cl.⁶ .................................................. A47F 5/12
[52] U.S. Cl. ................. 108/2; 108/9; 248/372.1
[58] Field of Search ....................... 108/1, 2, 6, 7, 108/8, 9; 248/372.1, 371, 398, 188.1

[56] References Cited

U.S. PATENT DOCUMENTS

| 127,839 | 6/1872 | Blackburn ................. 108/1 X |
| 1,568,850 | 1/1926 | Koch ............................ 108/2 |
| 1,956,546 | 4/1934 | Froelich ....................... 108/2 |
| 3,012,363 | 12/1961 | Sautereau .................... 108/7 |
| 3,020,016 | 2/1962 | Kingsbury . | |
| 3,079,726 | 3/1963 | May ......................... 108/8 X |
| 3,545,710 | 12/1970 | Mooney . | |
| 3,710,735 | 1/1973 | Litvinoff et al. ........... 108/9 X |

FOREIGN PATENT DOCUMENTS

| 1025595 | 4/1953 | France ........................ 108/2 |
| 2254090 | 7/1975 | France . |
| 736345 | 6/1943 | Germany . |
| 807555 | 1/1959 | United Kingdom . |
| 1316250 | 5/1973 | United Kingdom . |

*Primary Examiner*—Jose V. Chen
*Attorney, Agent, or Firm*—Kenyon & Kenyon

[57] ABSTRACT

A counter-balanced tiltable platform (10) is provided for receiving and supporting a load such as a camera. The arrangement includes a base (11), an intermediate support (13) mounted on the base to move in a vertical direction with respect to the base, a pivot mechanism (15) for mounting the platform on the intermediate support to tilt about a horizontal axis in either direction from a normal position, a mechanism for positioning a load on the platform with its center of gravity over the horizontal axis when the platform is in said normal position and a link and bell crank lever arrangement (25, 27, 31) acting through the intermediate support to raise the support and thereby the platform in response to tilting of the platform in either direction from the normal position to maintain the center of gravity of the loaded platform in a constant horizontal plane and thereby to counter-balance the loaded platform.

18 Claims, 9 Drawing Sheets

TILTABLE LOAD SUPPORTING PLATFORMS

BACKGROUND OF THE INVENTION

1. Field of the Invention

This invention relates to tiltable load supporting platforms and is particularly although not exclusively applicable to platforms for receiving and supporting cameras including film, T.V. and video cameras.

2. Background Prior Art

UK-A-807755 discloses a tilt mounting for supporting an article such as a television or cinematograph camera. The mounting comprises a frame, a tiltable support member to which the article is secured, guide means on the frame cooperating with guide means on the support member and omitting said support member to tilt and to rise and fall, a cam on the support member and a cam follower on the mounting frame to constrain the member to rise as it is tilted from its horizontal position and to sink as it returns to its horizontal position. The arrangement is such that, during tilting, the centre of gravity of an article on the support member is maintained substantially at a constant height while it is moving in a substantially horizontal plane. The shape of the cam is determined by the height of the centre of gravity of the article above the support member on which it is mounted. Thus the mechanism does not cater for a range of articles which have centres of gravity at different heights.

FIGS. 3 and 4 of UK-A-807755 show a modified form of mounting in which pivots of the mechanism which respond to tilting of the platform are provided with alternate hole positions to enable the mechanism to be adapted to suit different payloads. It is intended that the arrangement should be capable of accommodating cameras having centres of gravity at different heights above the mounting plate which in effect, the adjustments provided enable the platform to be operated at different heights above the cam but not to accommodate for different centres of gravity of the payload above the platform.

UK-A-316250 discloses an adaptation of the above tilt mounting in which a friction device is provided for braking the tilting movement of the mounting.

UK-A-14510898 discloses a further form of tilt mounting for an article comprising a mounting frame, tiltable support member to which the article may be secured, a pantographical linkage in a generally vertical plane operably connecting the tiltable support member above the mounting frame and low bearing means located on at least one link of the pantographical linkage which, when moved along substantially horizontal guide means on the mounting frame maintains the centre of gravity of the article in a part substantially parallel to the low bearing means and therefore in a substantially horizontal path when the support member is tilted. This arrangement has the disadvantage that only a relatively small range of tilt can be provided.

The purpose of the present invention is to provide a tiltable support mounting for an article such as a television or cinematograph camera which is more readily adaptable to suit loads of differing centres of gravity whilst providing a wide range of tilt angle.

SUMMARY OF THE INVENTION

This invention provides a counter-balanced tiltable platform for receiving and supporting a load having a base, means to mount the platform on the base for tilting about a horizontal axis in either direction from a normal position, means to locate a load on the platform with its centre of gravity over the horizontal axis when the platform is in said normal position and means to raise the platform in response to tilting of the platform in either direction from said normal position to maintain the centre of gravity of the loaded platform in a constant horizontal plane and thereby to counter-balance the loaded platform; wherein the means to mount the tiltable platform on the base comprise an intermediate support mounted on the base to rise and fall with respect to the base and pivot means for mounting the platform on the intermediate support to tilt about said horizontal axis and in that the means for raising the platform in relation to the base in response to tilting of the platform in either direction from said normal position comprise means acting through the intermediate support to raise the support and thereby the platform in response to tilting of the platform in either direction from said normal position; wherein the means for raising the platform with respect to the base in response to tilting of the platform from said normal position to maintain the centre of gravity of a load on the platform in a constant horizontal plane comprise a lever of adjustable mechanical advantage to cater for loads of different centres of gravity about the platform.

By utilising a mechanism acting through the intermediate support to the platform it is relatively easy to incorporate provision for adjustment to suit cameras of differing centres of gravity and also to provide a wide range of tilt angle in either direction.

In one arrangement according to the invention, the lever for raising the intermediate support/platform in response to tilting of the platform may have first means acting on the intermediate support for raising the intermediate support with respect to the base and second means responsive to tilting of the platform in either direction with respect to said normal position to move the lever to the extent required to compensate for lowering of the centre of gravity of the loaded platform when tilted to maintain the centre of gravity thereof in said constant horizontal plane.

More specifically said second means responsive to tilting of the platform may comprise a linearly movable member acting on the lever to raise the support in response to movement of the member in one direction and a uni-directional coupling between the platform and member for moving the member in said one direction in response to tilting of the platform from said normal position in either direction.

Further the uni-directional coupling responsive to tilting of the platform may comprises a linkage acting between the platform and intermediate support on which the linearly movable member is mounted to move the member in said one direction to cause the support to be raised when the platform is tilted in either direction from said normal position.

In either of the latter arrangements the linearly movable member may comprise an elongate guideway movable in a direction transverse to the guide with tilting of the platform and said other part of the lever may have a follower engaging the guideway to rotate the lever in response to linear movement of the guideway.

In any of the above arrangements said lever may be pivotally mounted in the support and has one part acting directly or indirectly on the base to raise the support with rotation of the lever in one direction and another part on which said second means acts moving in response to tilting of the platform.

For example said one part of the lever may act on the mounting for the intermediate support.

In addition the intermediate support may be mounted on the base by parallel links and said one part of the lever acts on the parallel linkage to raise the support with rotation of the lever in said one direction.

In the latter case a bridging link may be provided between the parallel links for the intermediate support and an elongate guideway is mounted on the bridging link to be engaged by a guide on said one part of the lever.

In any of the arrangements referred to above the length of one or other of the lever arms or the position of the lever pivot may be adjustable to vary the mechanical advantage of the lever.

In the case where said one part of the lever has a follower engaging a guideway, the follower may be adjustably mounted along the respective part of the lever.

In accordance with a further arrangement the bridging link between said parallel links may have an elongate guideway mounted thereon to have a linear component of movement with respect to the intermediate support and the tiltable platform has an arm extending transversely to the platform to pivot with the platform about said horizontal axis and having a follower to engage the guideway to move the guideway linearly with respect to the support with tilting of the platform in either direction from said normal position to raise the support through said parallel links with respect to the base and thereby maintain the centre of gravity of a load on the platform in a constant horizontal plate throughout the range of tilt of the platform.

In a further construction in accordance with the invention the intermediate support may be mounted on the base for vertical movement, the linearly movable member is mounted for movement on the support and an adjustable lever is pivotally mounted on the support to act on both the base and the vertically movable member to raise the support in response to tilting of the platform in either direction away from said normal position.

In the latter case the linearly movable member may be mounted for vertical movement on the intermediate support and may have one end adjacent the platform formed with an elongate guideway extending transversely to the member and the platform has an arm mounted to rotate with the platform about said horizontal axis with a follower for engaging the guideway to displace the member with rotation of the platform about said horizontal axis to act on said lever to raise the support to maintain the centre of gravity of the loaded platform in a constant horizontal plane whatever the tilt angle of the platform.

In addition the lower end of the linearly movable member may be formed with a further guideway extending transversely thereto and the lever has a guide engaging the guideway to transmit movement of the member to the lever and thereby to the support.

In the further arrangement, the base may also have a guideway and the lever may have a guide engaging the guideway on the base.

DESCRIPTION OF THE PREFERRED EMBODIMENTS

Figure 1:
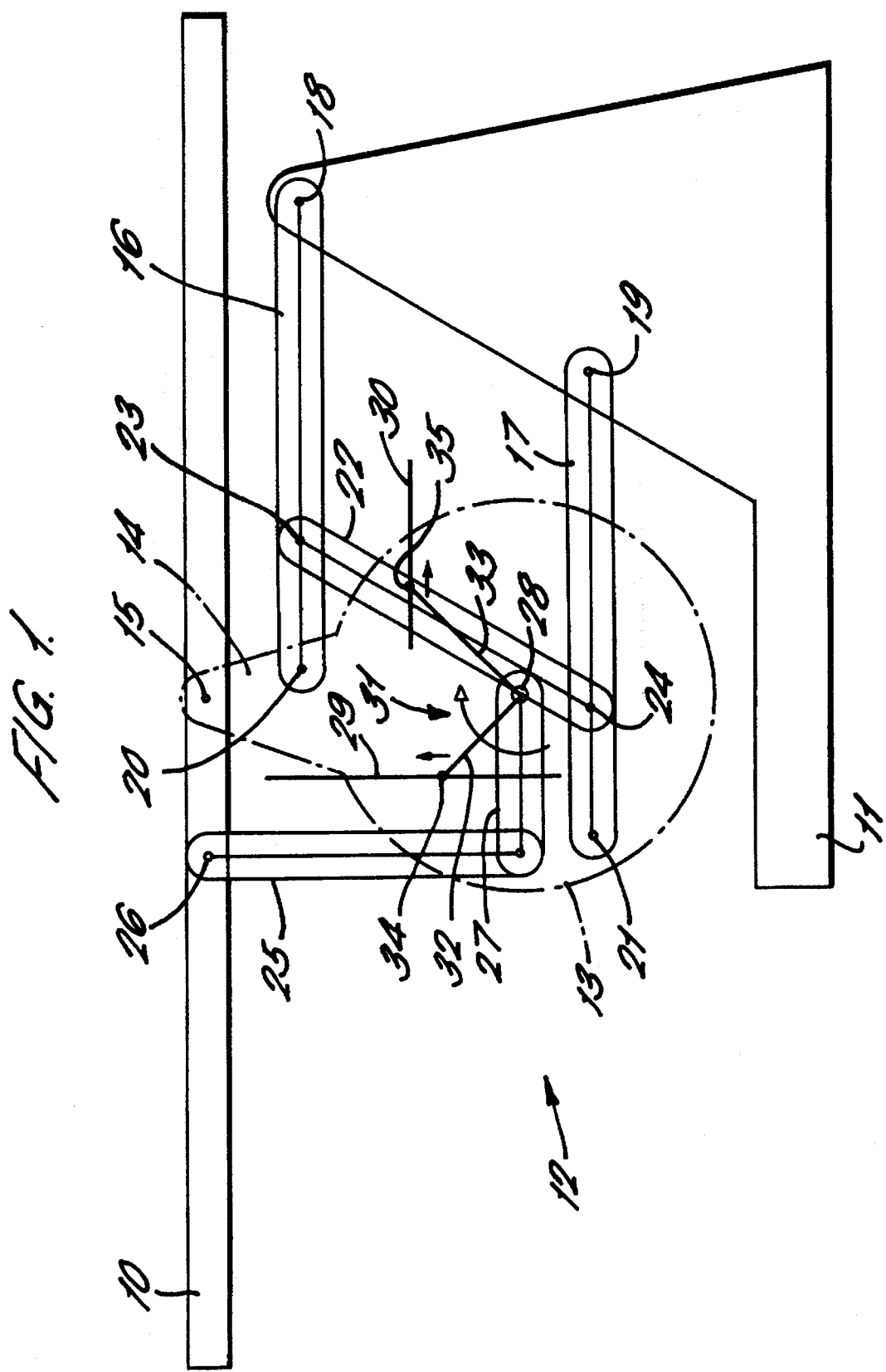
FIG. 1 is a diagrammatic side view of a counter-balanced tiltable platform for mounting for a camera having a relatively high centre of gravity with the platform horizontal.
Figure 2:
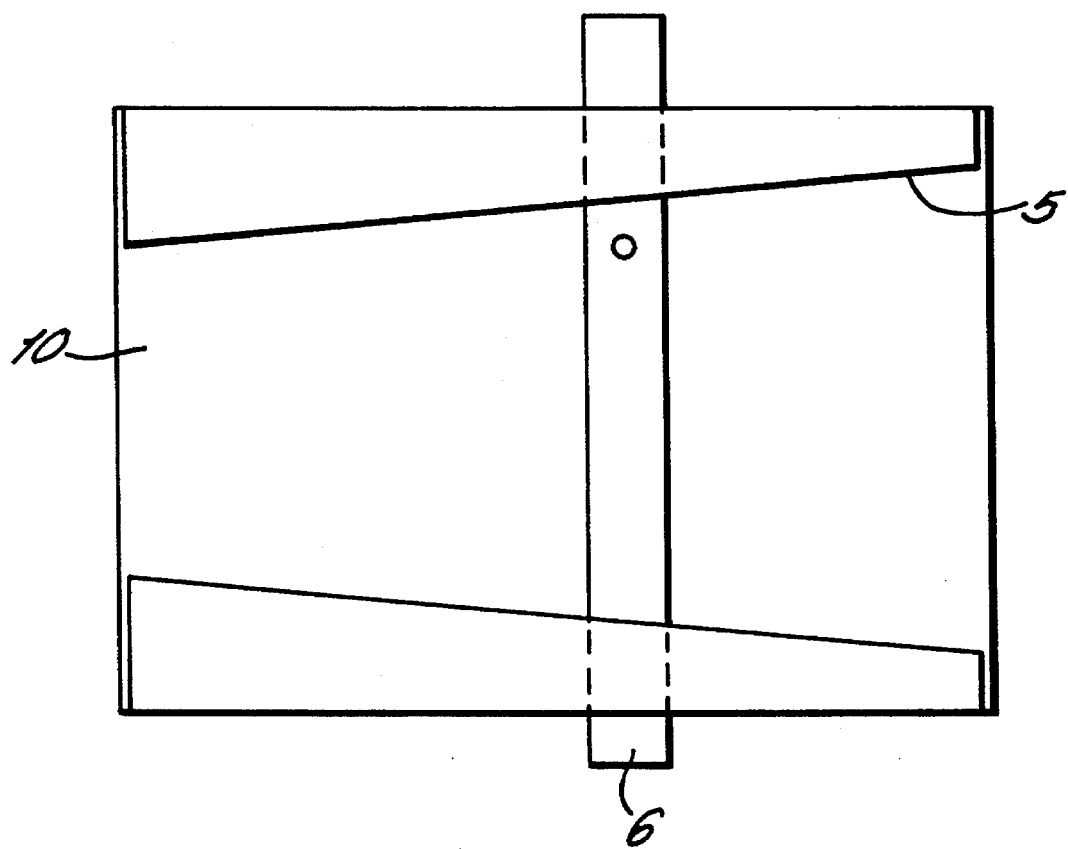
FIG. 2 is a plan view of the platform only.

Referring firstly to FIGS. 1 and 2 of the drawings, there is shown a horizontally extending tiltable platform 10 having a conventional wedge adaptor 5 to receive a camera wedge and a locking bar 6 to lock the camera wedge in the adaptor. A base 11 is provided for the mounting and a mechanism indicated generally at 12 supports the platform on the base for tilting movement about a horizontal axis with counterbalance to maintain the centre of gravity of the camera on the platform vertically static, that is in the same horizontal plane throughout.

The mechanism comprises an intermediate support 13 having an upstanding element 14 to which the platform 10 is mounted for pivotal movement about a horizontal axis at 15. The locking device is arranged to secure the camera with its centre of gravity directly vertically above the horizontal axis 15 when the platform is horizontal. The intermediate support 13 is carried on a vertically spaced pair of parallel links 16, 17 pivotally mounted at vertically spaced locations, 18, 19 respectively on the base 11 and at spaced locations 20 and 21 on the mounting body 13. The links 16, 17 are interconnected by a bridging link 22 pivotally connected at 23 to link 16 and at 24 to link 17.

The mechanism 12 is connected to the platform 10 to respond to tilting of the platform about its pivotal axis 15 by a vertical link 25 pivotally connected at 26 to the underside of the platform 10 to one side of the pivotal mounting 15 and a link 27 connected between the lower end of link 25 and a pivot 28 at the centre of the intermediate support 13. The links 25, 27 thus form a parallel linkage with the support 13 and platform 10.

Link 25 has a vertically extending elongate track 29 (shown spaced from the link for the sake of clarity) and bridging link 22 has a horizontally extending elongate track 30. A bell crank lever indicated at 31 is pivotally mounted on the central pivot 28 of the intermediate support and has a pair of arms 32, 33 extending generally right angles to each other. One of the arms 32 carries a guide in the form of a simple roller 34 at the end thereof which engages the track 29 and the other of the arms 33 carries a similar roller 35, which engages the track 30. The roller 35 is adjustable along the length of the lever arm 33 for a purpose to be described later.

Figure 3:
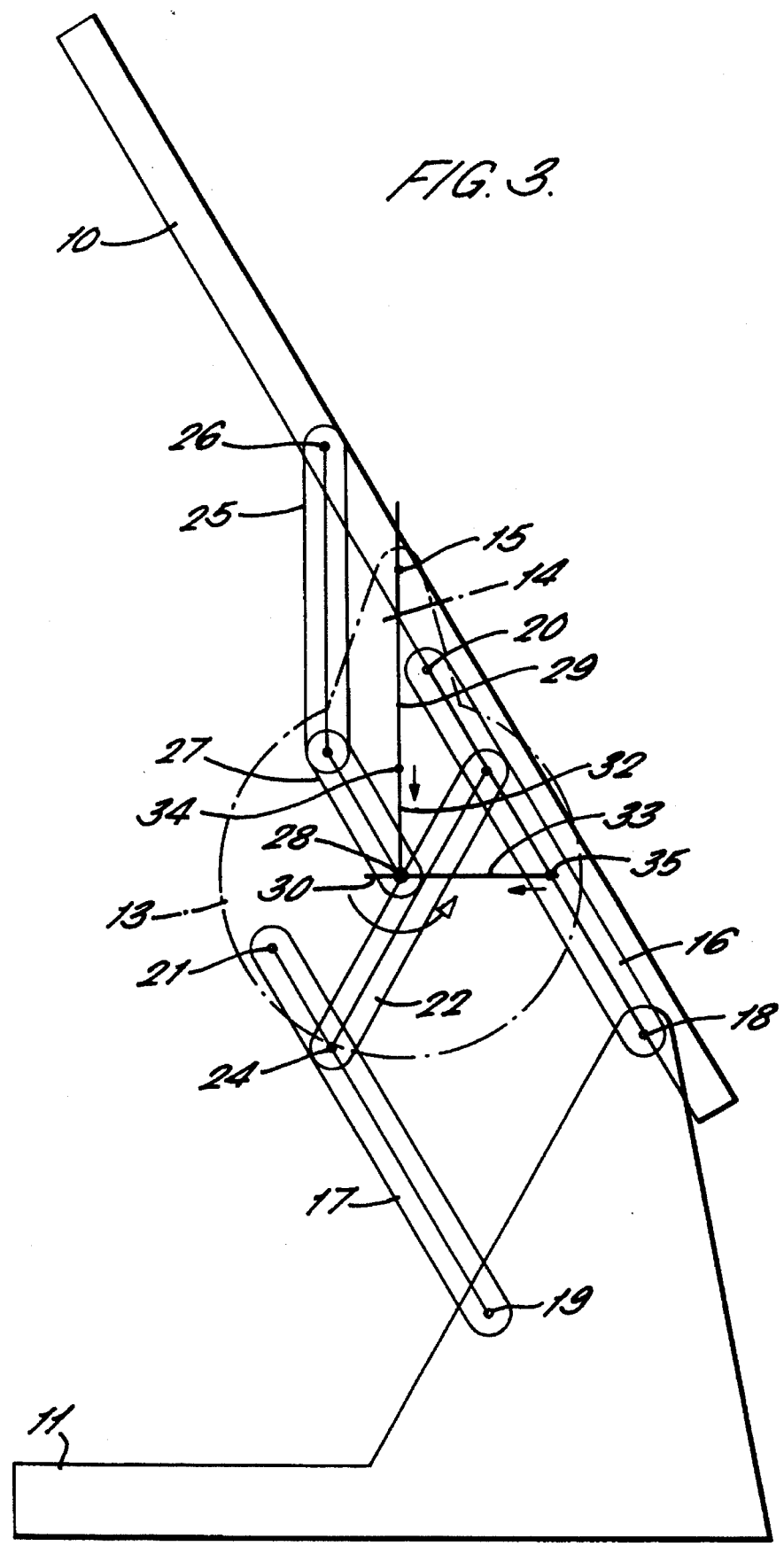
FIG. 3 is a view of the platform of FIG. 1 tilted to the limit of its travel in one direction.

It will be appreciated that as the platform 10 tilts about its pivotal mounting 15, the resulting movement imparted to the track 29 through the link 25 will cause the bell-crank lever 31 to rotate about pivot 28 and, in turn, cause the track 20 to create a corresponding movement in the parallel linkage 16, 17 supporting the mounting body 13. The geometry of the arrangement is such that as the platform 10 is tilted from the horizontal in either direction about the horizontal axis 15 causing the centre of gravity of the camera supported on the platform to move downwardly, so the lever mechanism acting on the parallel links lifts the intermediate support to raise the platform and thereby maintain the centre of gravity of the camera/platform static in the vertical sense, that is, in the same horizontal plane. FIG. 3 shows the platform tilted to one limit of its adjustment and it will be noted that the mounting body 13 has moved upwardly raising the platform to maintain the centre of gravity of the camera on the platform static vertically.

Figure 4:
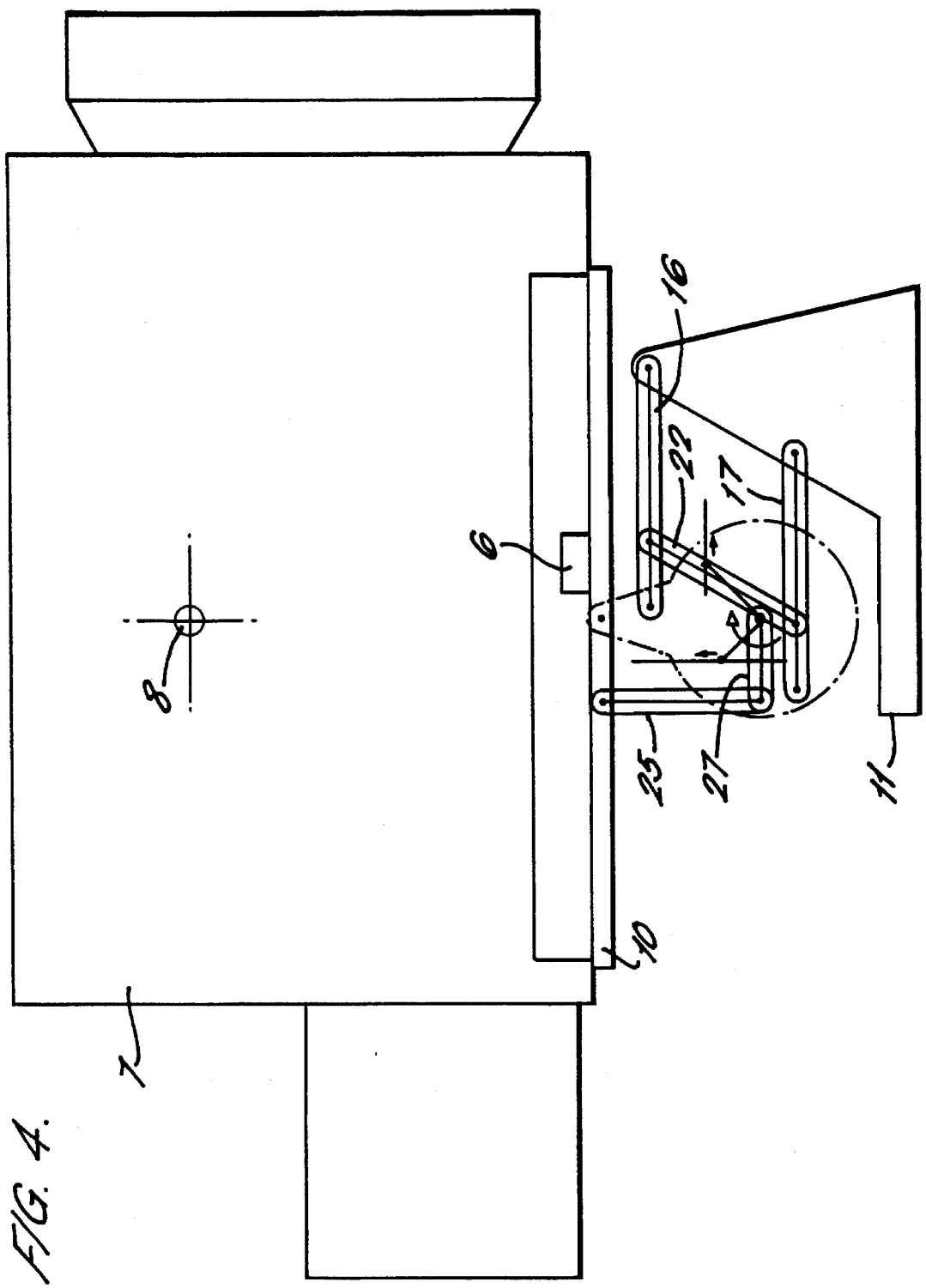
FIGS. 4 and 5 are similar views to FIGS. 1 and 2 with a camera located on the platform.
Figure 5:
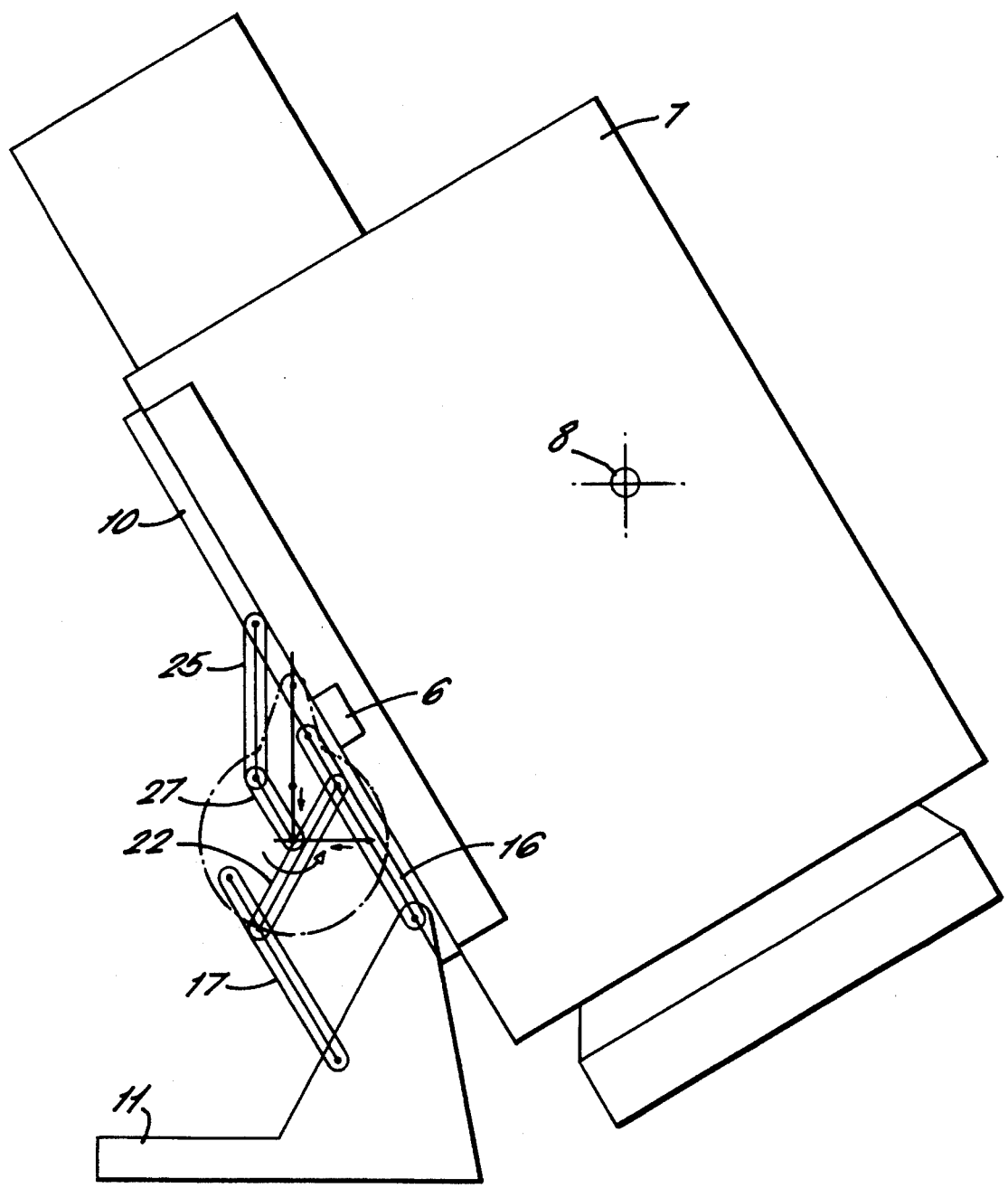

FIGS. 4 and 5 of the drawings are similar views to FIGS. 1 and 3 with a camera 7 illustrated in outline only installed on the platform 10. The centre of gravity of the camera is indicated at 8. It will be noted that in the different attitudes of the platform shown, the centre of gravity of the camera is displaced horizontally but not vertically in relation to the base 11.

The linkages on one side only of the platform have been illustrated for the sake of simplicity. In practice duplicate sets of links 25 and 27 and 16, 17 and 22 are provided on both sides of the platform.

Figure 6:
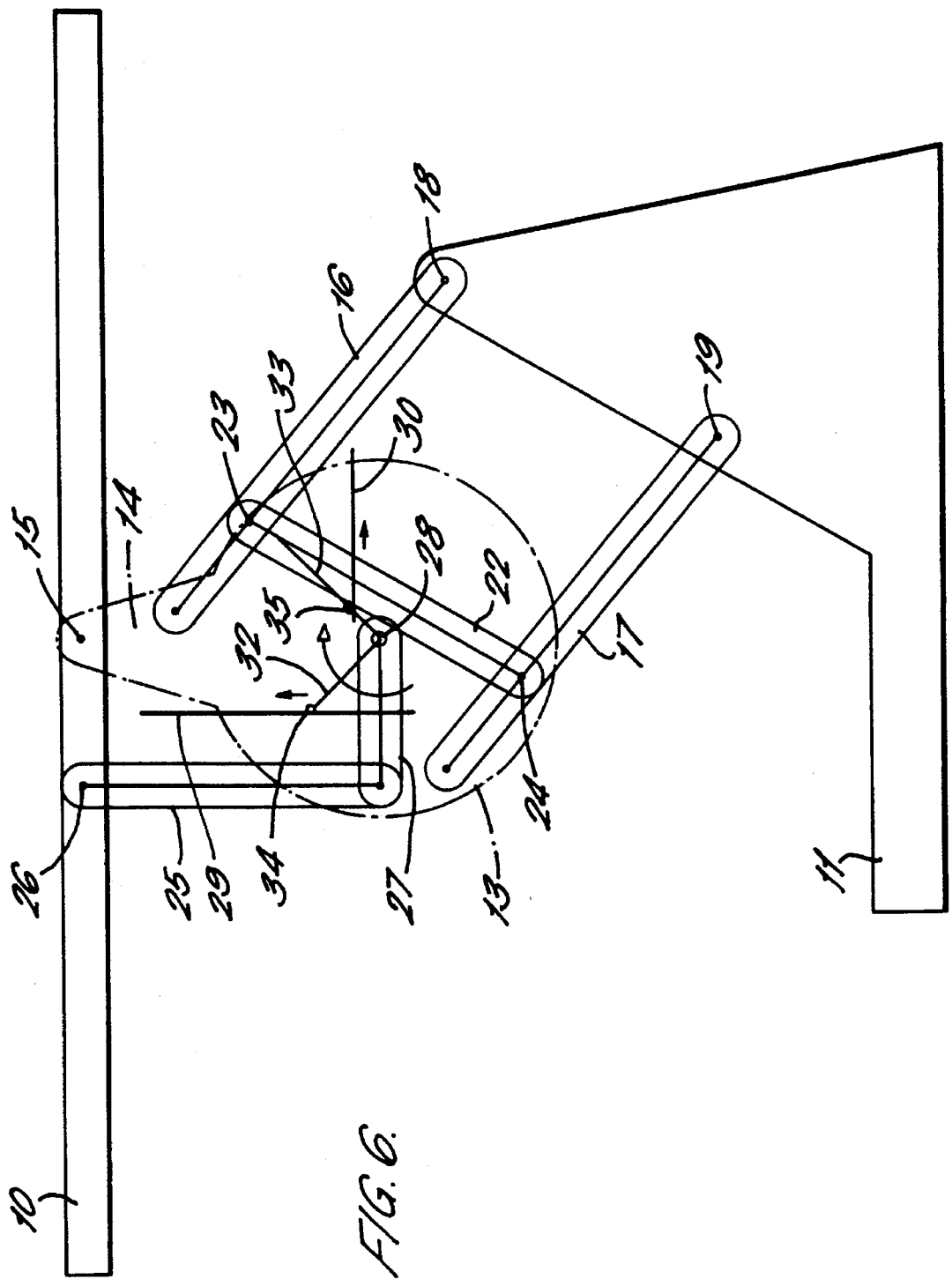
FIG. 6 is a view of the mounting of FIG. 1 with the platform adapted for a camera with a low centre of gravity with the platform horizontal.
Figure 7:
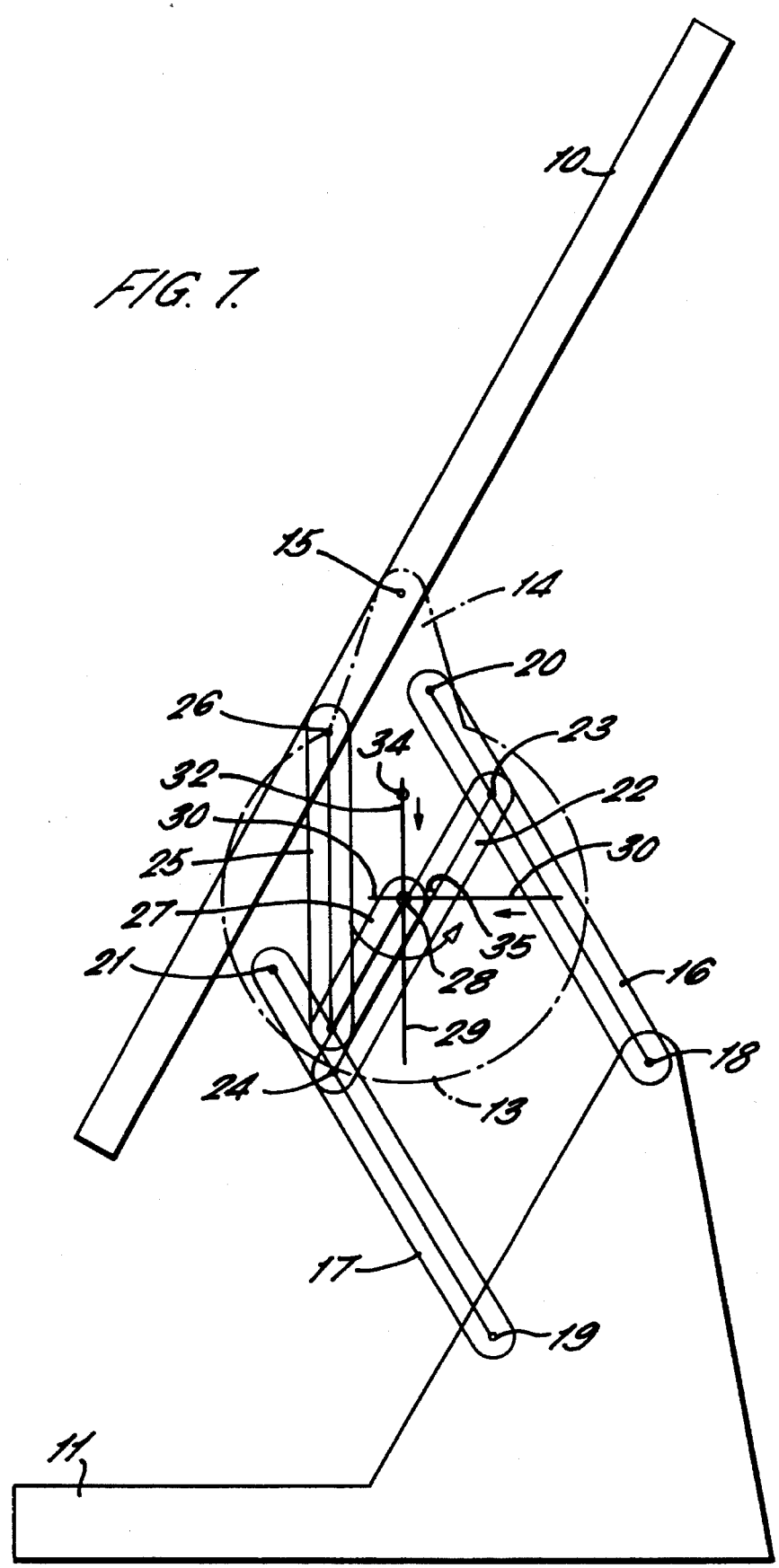
FIG. 7 is a view of the mechanism of FIG. 6 with the platform tilted shown tilted.

It will be appreciated that the centre of gravity of the camera will vary from camera to camera (typically it varies between about 7 cms and 25 cms. above the platform) and it is important therefore to be able to cater for this. By way of example this can be achieved by varying the effective length of the lever arm 33 by adjusting the location of the roller 35 along the arm 33. In the arrangement of FIGS. 1 and 3, the mechanism is set for a camera with a high centre of gravity with the roller 35 at the end of the arm 33 whereas in the arrangement of FIGS. 6 and 7, the roller is set for a camera having a lower centre of gravity.

A rotary damping device (not shown) may be built into the mechanism to rotate in unison with the platform to smooth the movement of the platform. Also a separate brake mechanism may be provided to lock the platform at a selected angle of tilt.

The arrangement provides a relatively simple and efficient counter-balanced tiltable platform for supporting a load such as a camera which is capable of tilting over a wide range of tilt angle and which can be readily adjusted to suit cameras having differing centres of gravity.

Figure 8:
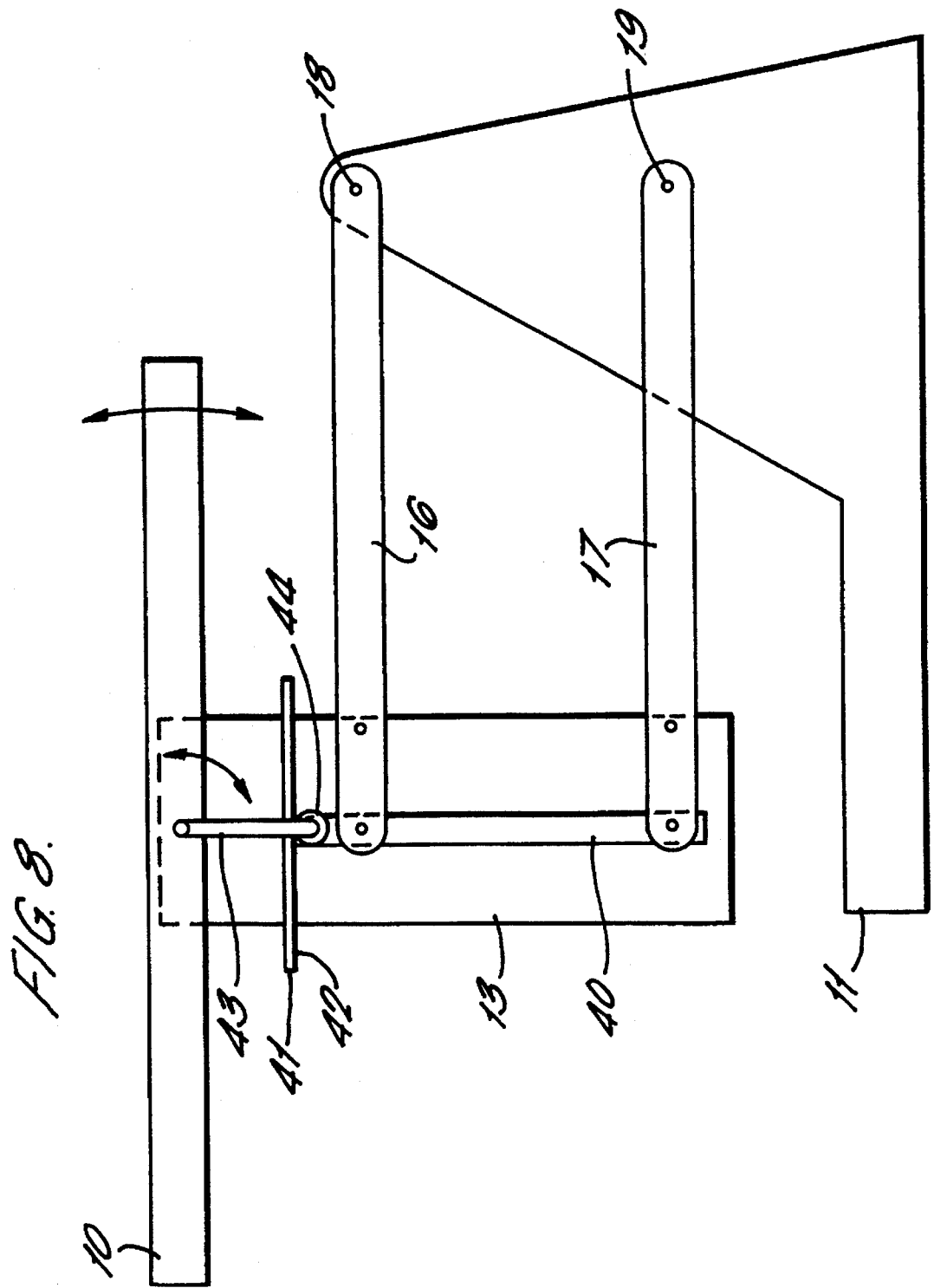
FIG. 8 is a view of a simplified counter-balanced tiltable platform according to the invention.

Referring now to FIG. 8 of the drawings, there is shown a simplified version of the mechanism in which like parts have been given the same reference numerals. The bell crank lever arrangement 31 is dispensed with as are the links 25, 27. The parallel links 16, 17 are extended beyond the pivotal connections 20, 21 to the intermediate support 13 and are interconnected by a vertically extending bridging member 40 pivotally connected to the extended ends of the parallel links. The upper end of the member 40 has a track 41 fixed thereto with the guide surface 42 on the underside of the track and the platform 10 has a fixed downwardly extending arm 43 secured to the platform to swing with the platform about the pivotal axis 15. The lower end of the arm carries a guide roller 44 engaging the track 41. The arrangement is such that when the platform 10 is tilted in either direction from the horizontal, the platform 41 is raised with respect to the intermediate support thereby tilting links 16 and 17 with respect of the support to raise or lower as appropriate the intermediate support with respect to the base to maintain the centre of gravity of a load on the platform in a constant horizontal plane as aforesaid. The roller is mounted for adjustment along the arm 43 to vary the displacement of the track in response to tilting of the platform to cater for loads of differing centres of gravity.

Figure 9:
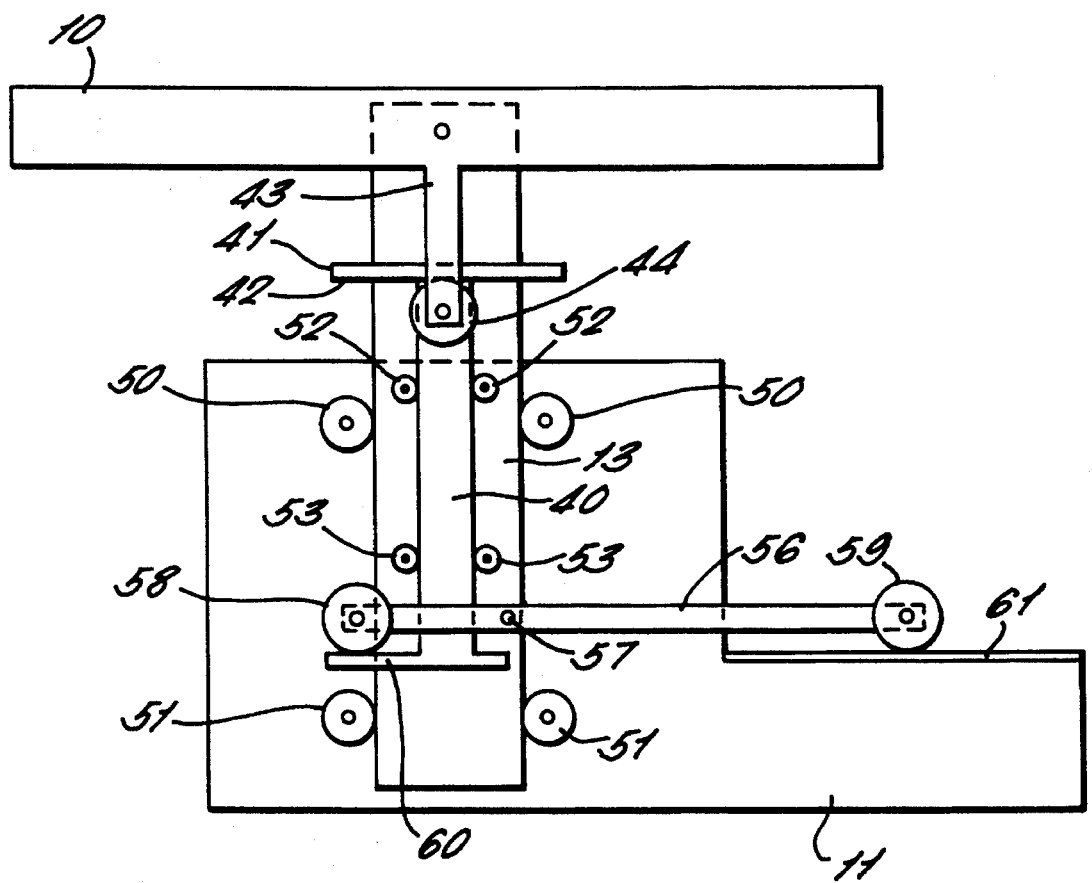
FIG. 9 is a diagrammatic view of a further embodiment.

Referring now to FIG. 9 of the drawings, there is shown a modification of the arrangement shown in FIG. 5 in which the intermediate support 13 is mounted on the base 11 to move in a vertical direction by means of upper and lower pairs of rollers 50, 51 in place of the parallel links 16, 17. The bridging member 40 is retained supported to move vertically on the support 13 between upper and lower pairs of rollers 52, 53. The upper end of the member 40 carries the transversely extending track 41 with its guide surface on the underside engaged by roller 44 on arm 43 secured to the tiltable platform 10 as before.

An elongate lever 56 is pivotally mounted at 57 on the support 13 and has rollers 58 and 59 mounted for rotation at its respective ends. The lower end of bridging member 40 is formed with an upwardly facing elongate guideway 60 at its lower end with which roller 58 engages and the base 11 is formed with a further upwardly facing track 61 with which roller 59 engages. Thus lifting of the bridging member 40 by the arm 43 with respect to support 13 with tilting of the platform 10 from its horizontal position as shown lifts the lever about the roller 59 thereby lifting the intermediate support 13 through the pivot 57 to raise the platform and maintain the centre of gravity of the loaded platform in a constant horizontal plane.

The mechanism can be adjusted to suit loads of differing centres of gravity by adjusting one or other of the rollers 58, 59 along the lever or by adjusting the pivot 57 along the lever 56 or by adjusting roller 44 along arm 43.

I claim:

1. A counter-balanced tiltable platform for receiving and supporting a load having a base, means to mount the platform on the base for tilting about a horizontal axis in either direction from a normal horizontal position, means arranged with said platform to locate a load on the platform with its centre of gravity over the horizontal axis when the platform is in said normal position and means mounted on the base to raise the platform in response to tilting of the platform in either direction from said normal position to maintain the centre of gravity of the loaded platform in a constant horizontal plane and thereby to counter-balance the loaded platform, the means to mount the tiltable platform on the base comprising an intermediate support mounted on the base to rise and fall with respect to the base and pivot means for mounting the platform on the intermediate support to tilt about said horizontal axis, said means for raising the platform in relation to the base in response to tilting of the platform in either direction from said normal position comprising means acting through and connected with the intermediate support to raise the support and thereby the platform in response to tilting of the platform in either direction from said normal position; wherein the improvement comprises providing the means for raising the platform with respect to the base in response to tilting of the platform from said normal position to maintain the centre of gravity of a load on the platform in a constant horizontal plane with a lever of adjustable mechanical advantage connected to said base and said platform to cater for loads of different centres of gravity about the platform.

2. A tiltable platform as claimed in claim 1, wherein the lever for raising the intermediate support/platform in response to tilting of the platform has first means acting on the intermediate support for raising the intermediate support with respect to the base and second means responsive to tilting of the platform in either direction with respect to said normal position to move the lever to the extent required to compensate for lowering of the centre gravity of the loaded platform when tilted to maintain the centre of gravity thereof in said constant horizontal plane.

3. A tiltable platform as claimed in claim 2, wherein the said second means responsive to tilting of the platform comprise a linearly movable member acting on the lever to raise the support in response to movement of the member in one direction and a uni-directional coupling between the platform and member for moving the member in said one direction in response to tilting of the platform from said normal position in either direction.

4. A tiltable platform as claimed in claim 3, wherein the uni-directional coupling responsive to tilting of the platform comprises a linkage acting between the platform and intermediate support on which the linearly moveable member is mounted to move the member in said one direction to cause the support to be raised when the platform is tilted in either direction from said normal position.

5. A tiltable platform as claimed in claim 3, wherein the intermediate support is mounted on the base for vertical movement, the linearly movable member is mounted for movement on the support and a lever is pivotally mounted on the support to act on both the base and the vertically movable member to raise the support in response to tilting of the platform in either direction away from said normal position.

6. A tiltable platform as claimed in claim 5, wherein the linearly movable member is mounted for vertical movement on the intermediate support and has one end adjacent the platform formed with an elongate guideway extending transversely to the member and the platform has an arm mounted to rotate with the platform about said horizontal axis with a follower for engaging the guideway to displace the member with rotation of the platform about said horizontal axis to act on said lever on the support to raise the support to maintain the centre of gravity of the loaded platform in a constant horizontal plane whatever the tilt angle of the platform.

7. A tiltable platform as claimed in claim 6, wherein the lower end of the linearly movable member is formed with a further guideway extending transversely thereto and the lever has a guide engaging the guideway to transmit movement of the member to the lever and thereby to the support.

8. A tiltable platform as claimed in claim 6, wherein the base also has a guideway and the lever acting on the base has a guide engaging the guideway.

9. A tiltable platform as claimed in claim 6, wherein the mechanical advantage of the lever is adjustable to cater for loads of differing centres of gravity to be supported on the platform.

10. A tiltable platform as claimed in claim 3, wherein the first means to raise the intermediate support with respect to the base comprise a lever mechanism pivotally mounted on the support having one part acting directly or indirectly on the base to raise the support with rotation of the lever in one direction and another part on which said second means moving in response to tilting of the platform acts.

11. A tiltable platform as claimed in claim 3 wherein the linearly movable member comprises an elongate guideway movable in a direction transverse to the guide with tilting of the platform and said other part of the lever has a follower engaging the guideway to rotate the lever in response to linear movement of the guideway.

12. A tiltable platform as claimed in claim 2, wherein said lever is pivotally mounted in the support and has one part acting directly or indirectly on the base to raise the support with rotation of the lever in one direction and another part on which said second means acts moving in response to tilting of the platform.

13. A tiltable platform as claimed in claim 12, wherein said one part of the lever acts on the mounting for the intermediate support.

14. A tiltable platform as claimed in claim 13, wherein the intermediate support is mounted on the base by parallel links and said one part of the lever acts on the parallel linkage to raise the support with rotation of the lever in said one direction.

15. A tiltable platform as claimed in claim 14, wherein a bridging link is provided between the parallel links for the intermediate support and an elongate guideway is mounted on the bridging link to be engaged by a guide on said one part of the lever.

16. A tiltable platform as claimed in claim 15, wherein the bridging link between said parallel links has an elongate guideway mounted thereon to have a linear component of movement with respect to the intermediate support and the tiltable platform has an arm extending transversely to the platform to pivot with the platform about said horizontal axis and having a follower to engage the guideway to move the guideway linearly with respect to the support with tilting of the platform in either direction from said normal position to raise the support through said parallel links with respect to the base and thereby maintain the centre of gravity of a load on the platform in a constant horizontal plate throughout the range of tilt of the platform.

17. A tiltable platform as claimed in claim 1, wherein said lever includes two lever arms pivotally mounted at a lever pivot wherein the length of one or other of the lever arms or the position of the lever pivot is adjustable to vary the mechanical advantage of the lever.

18. A tiltable platform as claimed in claim 17, wherein one part the lever has a follower engaging a guideway on a bridging link connected to parallel links mounted on the base, wherein the follower is adjustably mounted along said one part of the lever.

* * * * *